United States Patent [19]

Otsuki et al.

[11] 4,137,282
[45] Jan. 30, 1979

[54] PROCESS FOR PRODUCING WATER-DISPERSIBLE FILM-FORMING MATERIAL

[75] Inventors: Yutaka Otsuki, Yokohama; Hideo Horii, Tokyo; Yoshihiko Araki, Kawasaki, all of Japan

[73] Assignee: Nippon Oil Company, Ltd., Japan

[21] Appl. No.: 858,457

[22] Filed: Dec. 5, 1977

[30] Foreign Application Priority Data

Dec. 10, 1976 [JP] Japan .................... 51-147668

[51] Int. Cl.$^2$ .............................................. C08F 279/06
[52] U.S. Cl. .................................. 260/879; 260/880 R
[58] Field of Search ............ 260/879, 880 R; 526/49, 526/50, 21

[56] References Cited

U.S. PATENT DOCUMENTS

| | | | |
|---|---|---|---|
| 3,786,116 | 1/1974 | Milkovich | 260/879 |
| 3,879,358 | 4/1975 | Lachowicz | 260/879 |
| 3,887,653 | 6/1975 | Konishi | 260/879 |
| 4,072,536 | 2/1978 | Otsuki | 526/49 |

Primary Examiner—Paul R. Michl
Attorney, Agent, or Firm—Wenderoth, Lind & Ponack

[57] ABSTRACT

A process for producing a film-forming material, which comprises graft-polymerizing a monomer having a radical polymerizable ethylenically unsaturated group in the presence of a radical initiator with a butadiene polymer of a low degree of polymerization having a number average molecular weight of 300 to 10,000, a butadiene copolymer of a low degree of polymerization containing not more than 50% by weight of a copolymer component, or a mixture of these, in the form of an aqueous solution, said butadiene polymer or copolymer in aqueous solution or aqueous dispersion containing 0.05 to 0.5 mole, per 100 g of the polymer, of a basic group of the general formula

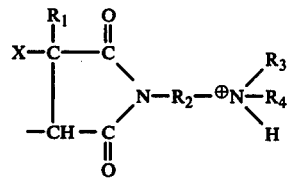

wherein $R_1$ represents a hydrogen atom, a halogen atom or an organic group containing 1 to 8 carbon atoms; $R_2$ and $R_3$ are identical or different and represent an organic group containing 1 to 20 carbon atoms; $R_4$ represents a hydrogen atom or an organic group containing 1 to 20 carbon atoms; and X represents a hydrogen atom or a bond, and when X is a bond, the carbon atom attached to $R_1$ and the adjacent carbon atom to which hydrogen is attached may form a part of the main chain.

5 Claims, No Drawings

PROCESS FOR PRODUCING WATER-DISPERSIBLE FILM-FORMING MATERIAL

This invention relates to the production of a water-dispersible film-forming material composed of an emulsion of fine particle size derived from a butadiene polymer of copolymer with a low degree of polymerization which will be referred to simply as a low polymer or copolymer of butadiene.

Water-base paints are classified into aqueous solution and emulsion types. Since these paints use water as a thinner, they have the advantage of being free from toxicity and flammability and cheaper than organic solvent-base paints.

Conventional aqueous solution-type water-base paints containing resins of high molecular weights are useless for practical purposes because of their high viscosity. Accordingly, only relatively low-molecular-weight resins can be used, and thus coated films prepared from such aqueous solution-type water-base paints containing low-molecular-weight resins have low hardness, poor physical properties, and poor chemical properties such as water resistance and chemical resistance.

Accordingly, the aqueous solution-type water-base paints have limited uses, and no water-base paint has ever been developed which can be coated by ordinary coating methods such as spraying and afford coated films of superior properties by curing at room temperature.

The emulsion-type water-base paints, on the other hand, have the advantage that high-molecular-weight resins can be used, and the paints can be used in high concentrations because of their low viscosity. However, since surface-active agents are used in emulsion preparation, they have the defect that coated films have poor water resistance and gloss.

It is an object of this invention therefore to provide a process for producing a novel water-dispersible film-forming material which has good drying property at room temperature and gives coated films having gloss and superior properties.

The above object of this invention is achieved by a process for producing a film-forming material, which comprises graft-polymerizing a monomer having a radical polymerizable ethylenically unsaturated group in the presence of a radical initiator with a butadiene polymer of a low degree of polymerization having a number average molecular weight of 300 to 10,000, a butadiene copolymer of a low degree of polymerization containing not more than 50% by weight of a copolymer component, or a mixture of these, in the form of an aqueous solution or aqueous dispersion, said butadiene polymer or copolymer in aqueous solution or aqueous dispersion containing 0.05 to 0.5 mole, per 100 g of the polymer, of a basic group of the general formula

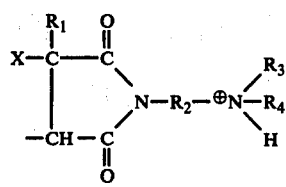

wherein $R_1$ represents a hydrogen atom, a halogen atom or an organic group containing 1 to 8 carbon atoms; $R_2$ and $R_3$ are identical or different and represent an organic group containing 1 to 20 carbon atoms; $R_4$ represents a hydrogen atom or an organic group containing 1 to 20 carbon atoms; and X represents a hydrogen atom or a bond, and when X is a bond, the carbon atom attached to $R_1$ and the adjacent carbon atom to which hydrogen is attached may form a part of the main chain.

The basic group-containing butadiene low polymer or copolymer may contain not more than 0.2 mole, per 100 g of the polymer, of a group expressed by the formula

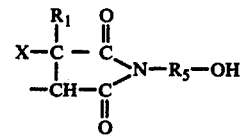

wherein $R_1$ and X are as defined above and $R_5$ represents an organic group containing 1 to 20 carbon atoms.

The basic group-containing low polymer or copolymer of butadiene used in this invention is disclosed in West German Patent Application P No. 2616591.3, U.S. patent application Ser. No. 676,886, and Japanese patent application No. 138406/76. This compound can be prepared by reacting (A) an organic polymer (dicarboxylic acid-modified butadiene polymer or copolymer) composed of (a) a low polymer of butadiene having a molecular weight of 300 to 10,000, a low butadiene copolymer containing not more than 50% by weight of a copolymer component, or a mixture of these and (b') an acid group bonded to the low butadiene polymer and/or copolymer through a carbon-carbon bond, the acid group being expressed by the formula

  (I)

or

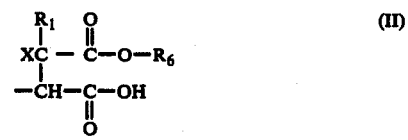  (II)

wherein $R_1$ and X are as defined above, and $R_6$ represents a hydrogen atom or an organic group containing 1 to 10 carbon atoms, and contained in an amount of 0.05 to 0.7 mole per 100 g of the resin, with (B) a diamine compound of the general formula

  (III)

wherein $R_2$ and $R_3$ are identical or different and represent an organic group containing 1 to 20 carbon atoms, and $R_4$ represents a hydrogen atom or an organic group containing 1 to 20 carbon atoms, to form a resinous material containing the basic group and unsaturated group, and then neutralizing the basic group with an acid.

The above reaction may be carried out in the presence of an aqueous medium or an organic liquid medium.

In the production of the resinous material, an alcohol amine compound (C) of the following general formula $$N_2H-R_5-OH \qquad (IV)$$

wherein $R_5$ represents an organic group containing 1 to 20 carbon atoms,
may be used together with the diamine compound of formula (III).

The low polymer or copolymer of butadiene used in this invention has a number average molecular weight of 300 to 10,000, and is liquid or semi-solid at room temperature. The low copolymer contains up to 50% by weight of a copolymer component. Examples of usable copolymer components are conjugated diolefins such as isoprene, 2,3-dimethyl butadiene and piperylene, and monomers containing ethylenic unsaturations, especially aliphatic or aromatic monomers such as isobutylene, diisobutylene, styrene, α-methylstyrene, vinyltoluene and divinylbenzene.

A mixture of the low butadiene polymer and the low butadiene copolymer containing such a copolymer component can also be used in this invention.

The polymer of copolymer with a low degree of polymerization can be produced by known methods. A typical method comprises the anionic polymerization of butadiene with or without not more than 50 mole% of a comonomer at 0° to 100° C. in the presence of an alkali metal or organic alkali metal compound as a catalyst, and usually results in a polymer containing about 25 to 80% of a 1,2-double bond and about 20 to 75% of a 1,4-double bond. To control molecular weight and obtain a light-colored low polymer with a reduced gel content, it is convenient to employ a chain-transfer polymerization method using an organic alkali metal compound such as benzyl sodium as a catalyst and a compound containing an alkylaryl group, such as toluene, as a chain-transfer agent, which usually affords a polymer containing about 50 to about 75% of a 1,2-double bond and about 20 to 40% of a 1,4-double bond (U.S. Pat. No. 3,789,090); a living polymerization method carried out in a tetrahydrofuran solvent using a polynuclear aromatic compound such as naphthalene as an activator and an alkali metal such as sodium as a catalyst which usually affords a polymer containing about 90% of a 1,2-double bond and about 10% of a 1,4-double bond (Japanese Patent Publications Nos. 17485/67 and 27432/68); and a method in which an aromatic hydrocarbon such as toluene or xylene is used as a solvent and a dispersion of a metal such as sodium in an organic solvent is used as a catalyst, and the molecular weight of the polymer is controlled by adding an ether such as dioxane (which method usually affords a polymer containing about 90% of a 1,2-double bond and about 10% of a 1,4-double bond) (Japanese Patent Publications Nos. 7446/57, 1245/58, and 10188/59).

By the polymerization methods exemplified hereinabove, a low polymer of low copolymers containing a major proportion of a 1,2-double bond or both a 1,2-double bond and a 1,4-double bond can be obtained. Those in which at least 40% of the double bond of the butadiene unit is a 1,2-double bond are preferred.

It is also possible to use partially oxidized products by blowing air into the resulting butadiene low polymer or copolymers in the presence of a dryer such as a metal naphthenate.

Furthermore, by adding an oxygen-containing compound such as carbon dioxide, water, alcohols or organic acids to the reaction mixture before stopping the polymerization in the aforesaid production of the low polymer or copolymers, there can be obtained polymers or copolymers having a functional group such as a hydroxyl or carboxyl group introduced into the ends of the polymer chain. These polymers or copolymers can also be used in the present invention.

The butadiene low polymer of copolymers used in this invention have a molecular weight of 300 to 10,000, preferably 500 to 5,000, and the content of the copolymer component in the low copolymer is preferably 5 to 30% by weight, more preferably 10 to 25% by weight.

The dicarboxylic acid-modified butadiene polymer or copolymer used in the present invention can be prepared by introducing an acid group of the following formula

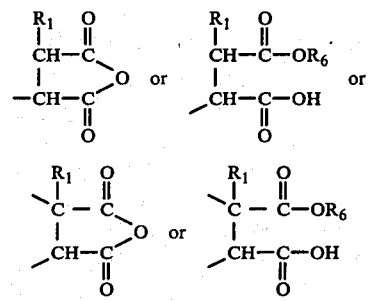

wherein $R_1$ represents a hydrogen atom or an organic residue containing 1 to 3 carbon atoms, and $R_6$ represents a hydrogen atom or an organic residue containing 1 to 20 carbon atoms,
into a low polymer or copolymer of butadiene.

Introduction of acid groups can be performed by using a conventional method which comprises adding maleic acid, maleic anhydride, citraconic acid, citraconic anhydride, etc. at a temperature of about 100° to 300° C. (Japanese Patent Publication No. 11195/71). A method can also be used preferably in which gellation is prevented by performing the reaction in the presence of phenylenediamine, pyrogallol, or naphthol (German OLS No. 2,362,534).

The amount of the acid group of the formula (I) or (II) is 0.05 to 0.7 mole, preferably 0.075 to 0.150 mole, per 100 g of the resin. If the amount of the acid group is less than 0.05 mole per 100 g of the resin, a product obtained by reacting the polymer (A) with the diamine compound (B) with or without the alcohol amine compound (C) and neutralizing the resulting resin with an acid has poor water-solubility. If the amount of the acid group is larger than 0.5 mole, the resulting neutralized resin has excessively high water-solubility, and therefore, coated films prepared from it have poor water resistance.

Examples of the diamine compound of formula (III) are dimethylaminoethylamine, diethylaminoethylamine, dimethylaminopropylamine, diethylaminopropylamine, dibutylaminopropylamine, methylaminoethylamine, ethylaminoethylamine, methylaminopropylamine, ethylaminopropylamine, hydroxyethylaminoethylamine, and hydroxyethylaminopropylamine. Mixtures of these amines can also be used.

Examples of the primary amine of formula (IV) and the hydroxyl-containing alcohol amine are monoethanolamine, monopropanolamine, monomethanolamine, and monobutanolamine.

In the present invention, the acid group-containing organic polymer (A) is reacted with the diamine compound (B) of formula (III) with or without the alcoholamine compound (C) of formula (IV). This reaction is an imidization reaction between the acid group and the primary amino group. The diamine compound and the alcoholamine compound may be reacted simultaneously or separately with the component (A). The total amount of the diamine compound and the optional alcoholamine compound is preferably equimolar to the acid group of component (A). It is also possible to use the amine compound in excess and distill off the excess after the reaction. The ratio between the diamine compound and the alcoholamine compound can be varied over a wide range. The amount of the diamine compound is usually 0.05 to 0.5 mole, preferably 0.1 to 0.25 mole, per 100 g of the resin. The amount of the alcoholamine compound is usually not more than 0.2 mole, preferably 0.01 to 0.1 mole, per 100 g of the resin.

The imidization reaction between the polymer having the acid group attached thereto through a carbon-carbon bond (component A) and the diamine compound (B) and/or the alcoholamine compound (C) is carried out at a temperature of 50° to 800° C., preferably 100° to 200° C. Since this reaction is an irreversible reaction, it is not particularly necessary to distill off the water generated out of the reaction system.

The imidization reaction can be carried out in the presence or absence of a solvent. When the polymer (A) containing the acid group and the double bond to be imidized has a low viscosity, it is preferred not to use a solvent. The solvent which is optionally used is a solvent miscible with the polymer (A), such as a hydrocarbon solvent (e.g., benzene, toluene, cyclohexane, or xylene), a hydrophilic alcohol solvent (e.g., butyl Cellosolve), and an ether type solvent (e.g., diglyme). It is preferred to use a hydrophilic solvent such as butyl Cellosolve, and to water-solubilize the resin directly.

This reaction affords a resin having an amido group and a secondary or a tertiary amino group with a side chain of the following formula

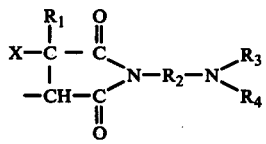

and/or a side chain of the formula

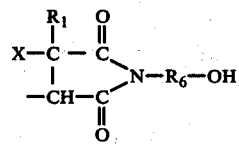

By the above imidization reaction, the acid group of the component (A) can be completely consumed to leave no acid group in the polymer after the imidization reaction. A part of the acid group may be left in the form of

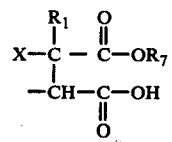

wherein $R_1$ represents a hydrogen atom or a methyl group, $R_7$ represents a hydrogen atom or an organic group with 1 to 8 carbon atoms, and X represents a hydrogen atom or a bond, and when X is a bond, the carbon atom bonded to $R_1$ and the adjacent carbon atom to which hydrogen is attached may form a part of the main chain. The amount of the acid group left is preferably not more than 0.2 mole per 100 g of the resin.

Water-solubilization of the resulting resin is performed by neutralizing it with 0.2 to 2.0 moles, preferably 0.5 to 1.0 mole, per mole of the group of formula (V) of a mineral acid such as hydrochloric acid or sulfuric acid, or a water-soluble organic acid such as formic acid, acetic acid or propionic acid.

This water-solubilization gives a group of the formula

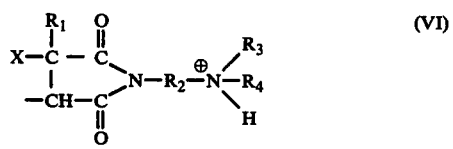

In water-solubilizing the resin in accordance with this invention, it is preferred to use 100 to 10 g, per 100 g of the resin, of an organic solvent being water-soluble and capable of dissolving the resin, such as ethyl Cellosolve, propyl Cellosolve, butyl Cellosolve, ethylene glycol dimethyl ether, diethylene glycol dimethyl ether, diacetone alcohol, or 4-methoxy-4-methyl-pentanone-2, to facilitate water solubilization, increase the stability of the aqueous solution, improve the flowability of the resin, and to improve the smoothness of the resulting coated film.

To dissolve or disperse the resin in the above medium, any means of mixing film-forming ingredients with a medium usually employed in the manufacture of paints is feasible in this invention. This can be accomplished for example, by using a conventional type of stirrer equipped with stirring vanes.

The monomer containing a radical polymerizable ethylenically unsaturated group used in this invention usually contains 1 to 24 carbon atoms, and has a Q value of at least about 0.1. The Q value which generally represents the radical polymerizability of a monomer containing a carbon-carbon double bond is described in a Japanese-language publication, "Journal of the Society of Organic Synthetic Chemistry", Vol. 28, No. 12, 1970, p. 1188.

Examples of the monomer are compounds of the formula

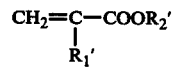

wherein $R_1'$ represents a hydrogen atom or a methyl group, and $R_2'$ represents an organic group containing 1 to 20 carbon atoms, such as methyl (meth)acrylate, butyl (meth)acrylate, methoxybutyl (meth)acrylate, diethylaminoethyl (meth)acrylate, ethylene glycol di(meth)acrylate, and styrene or styrene derivatives of the general formula

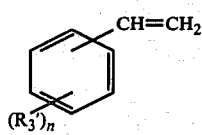

wherein n is an integer of 1 to 4, $R_3'$ represents a hydrogen atom, an alkyl group containing 1 to 10 carbon atoms, a vinyl group, or a halogen atom, such as α-methylstyrene, vinyltoluene or divinylbenzene. Two or more of these monomers may be used as a mixture.

The amount of the radical polymerizable ethylenically unsaturated monomer exemplified hereinabove is preferably 20 to 500 parts by weight, more preferably 80 to 200 parts by weight, per 100 parts by weight of the amino-containing butadiene low polymer or copolymer.

The radical polymerizable ethylenically unsaturated monomer can be grafted to the polymer or copolymer chain by the method which comprises polymerizing it in an aqueous solution or dispersion of the butadiene low polymer or copolymer having an amino group introduced into it. Advantageously, this polymerization can be performed in the presence of an organic or inorganic radical initiator at a reaction temperature of 20° to 200° C., prefrably 60° to 100° C. The radical polymerizable monomer may be added to the aqueous solution from the outlet, or may be added dropwise simultaneously with the reaction.

Examples of the radical initiators are organic initiators such as benzoyl peroxide, cumene hydroperoxide, azobisisobutyronitrile and ditertiary butyl peroxide, and inorganic initiators such as ammonium persulfate, potassium persulfate and sodium persulfate.

In this way, an aqueous emulsion having particles with a very fine particle size of, say, less than 1 micron can be obtained in which the radical polymerizable ethylenically unsaturated monomer is polymerized with the butadiene polymer or copolymer chain. This emulsion, without the need for a surface-active agent, has good storage stability. Since the polymer of this emulsion is cured with oxygen in the air to become an insoluble infusible coated film, it can be a vehicle which has characteristics not seen in conventional water-base paints. When the emulsion is used as an air drying water-base paint, it has good drying property, and affords a coated film having gloss and superior hardness, adhesion and water resistance. The coated film also has corrosion resistance since the resin is generally alkaline.

The following Examples illustrate the present invention.

The proportions of 1,2- and 1,4-double bonds contained in polybutadiene, and the water resistance and corrosion resistance of coated films, which are shown in the following examples, were measured by the following methods.

(1) Proportion of double bonds

Measured in accordance with the Morero method using an infrared spectrum ("Kobunshi", Vol. 13, page 252, 1964). According to this method, the total of the two types of double bonds is not necessary 100%.

(2) Water resistance

A sample was dipped in pure water at 40° C. in accordance with JIS K-5400, and the time (days) until an abnormal condition such as blistering occurs in the coated film was measured.

(3) Corrosion resistance

In accordance with JIS K-5400, a 5% aqueous solution of sodium chloride was sprayed onto a coated film having a cut provided therein, and after a lapse of 300 hours, the maximum width of rust which developed from the cut portion was measured.

EXAMPLE 1

A 30-liter autoclave was charged with 1 mole of benzyl sodium, 4 moles of toluene and 15 liters of n-hexane in a stream of nitrogen. After adjusting the temperature of the inside of the autoclave to 30° C., 10 liters of butadiene was charged into the autoclave over the course of 2 hours while maintaining the temperature at 30° C. Then, 200 ml of methanol was added to stop the polymerization. Terra alba (1 kg) was added, and the mixture was stirred vigorously, and then filtered to afford an alkali-free clear polymer solution. The unreacted butadiene, toluene and n-hexane were distilled off from the polymer solution to afford polybutadiene (A) having an iodine value of 450, a 1,2-bond content of 68% and a number average molecular weight of 2,000.

A 2-liter autoclave was charged with 1,000 g of polybutadiene (A), 150 g of maleic anhydride, 300 g of xylene, and 2 g of Antigen 3C (a trademark for a product of Sumitomo Chemical Co., Ltd.), and they were reacted in a stream of nitrogen at 190° C. for 8 hours. The unreacted maleic anhydride and xylene were distilled off under reduced pressure to afford maleinized liquid polybutadiene (A') having an acid value of 70.

The acid group in the maleinized polybutadiene (A') consisted mostly of

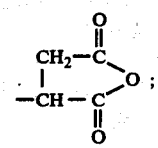

and partly of

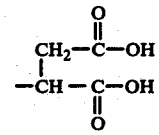

resulting from hydrolysis with water present in the air.

A 2-liter separable flask was charged with 1,000 g of maleinized polybutadiene (A'), 200 g of butyl Cellosolve, 91.3 g of dimethylaminopropylamine and 21.8 g of monoethanolamine, and they were heated at 140° C. for 5 hours to afford a butyl Cellosolve solution of polybutadiene (A") having a tertiary amino group and a hydroxyl group. The solution had a solids concentration of 83.0% by weight.

To 120.5 g of the solution was added 25 g of acetic acid, and pure water was added to prepare an aqueous solution having a solids concentration of 20% by weight. This aqueous solution was clear and stable with a very low viscosity.

The aqueous solution was uniformly mixed with stirring with 2 g of cobalt naphthenate and 1 g of tertiary butyl hydroperoxide. Methyl methacrylate (200 g) was added, and with stirring, the mixture was heated to 80° C., whereupon the generation of heat was observed. The mixture was cooled to room temperature, and the content of involatile matter was measured and found to be 42.9%. It was thus confirmed that the reaction proceeded to an extent of almost 100%. The resulting product was an emulsion of very fine particles.

Deionized water was added to the emulsion to adjust its involatile content to 36%. Then, 100 g of the emulsion was admixed with 29 g of titania, and they were uniformly dispersed by a high-speed rotary mixer.

The resulting paint was coated to a thickness of 24 microns on a mild steel panel using a 5 mil applicator. The coated film completely cured in about 1 hour at room temperature.

One week later, the properties of the coated film were measured. It was found to be a coated film having a pencil hardness of HB, a Du Pont impact value of 50 cm, an Erichsen value of 7 mm, a water resistance of 5 days, an acceptable alkali resistance after dipping in aqueous NaOH for 5 hours, and a good gloss.

EXAMPLE 2

The air in a 35-liter stainless steel autoclave equipped with a stirrer was replaced by nitrogen, and 8.1 kg of butadiene, 16 liters of toluene, 152 g of dioxane and 200 g of a dispersion of sodium were added. They were reacted at 80° C. for 2 hours. The catalyst was destroyed with water, and the reaction mixture was neutralized with hydrochloric acid. NaCl formed was removed from the reaction product by washing with water, and toluene was distilled off under reduced pressure. Thus, polybutadiene (B) was obtained in a yield of 86% based on the butadiene charged. The resulting polybutadiene had a number average molecular weight of 820, an iodine value of 420, a vinyl group content of 55%, a trans group content of 17%, a cis group content of 15%, and a viscosity of 7 poises (at 25° C.).

A 6-liter autoclave was charged with 2 kg of polybutadiene (B), 1 kg of xylene and 330 g of maleic anhydride, and they were reacted at 200° C. for 5 hours. Xylene and unreacted maleic anhydride were distilled off under reduced pressure to afford maleinized polybutadiene (B') having an acid value of 80.

A 500 ml separable flask equipped with a reflux condenser was charged with 100 g of maleinized polybutadiene (B'), 9.3 g of diethylaminopropylamine and 4.3 g of monoethanolamine. They were stirred at 150° C. for 2 hours to synthesize polybutadiene containing a tertiary amino group and a hydroxyl group. Then, 20 g of butyl Cellosolve and 3 g of manganese naphthenate were added to form a uniform mixture. It was then neutralized and diluted with an aqueous solution of acetic acid to prepare an aqueous solution of low viscosity having a solids concentration of 20%. To the aqueous solution was added 0.5 g of ammonium persulfate and the mixture was stirred until it became uniform. Then, with continued stirring, the temperature of the solution was raised to 75° C. A mixture of 100 g of n-butyl methacrylate and 100 g of styrene was added dropwise to the aqueous solution. After the addition, the solution was stirred for about 1 hour, and cooled to room temperature. The resulting emulsion was uniform, and did not change even after a lapse of three months. The emulsion had an involatile content of 42.0%.

Then, 100 g of the emulsion was diluted with deionized water until its involatile content became 35%. Titania (30 g) and 1 g of strontium chromate were added and kneaded with the emulsion for 10 hours using a ball mill. The resulting paint was brush-coated to a thickness of 22 microns. The coated film dried in about 35 minutes at room temperature, and had a good gloss.

EXAMPLE 3

A 20-liter autoclave was charged with 1.0 mole of benzyl sodium, 10 moles of toluene and 15 liters of benzene in a stream of nitrogen. Then, the temperature was adjusted to 30° C., and 10 liters of butadiene was charged into the autoclave over the course of 4 hours while maintaining the temperature at 30° C. The catalyst was decomposed with water, and the catalyst residue was removed by washing with water. Then, toluene, benzene and unreacted butadiene were distilled off to afford polybutadiene (C) having an iodine value of 420, a 1,2-bond content of 58% and a number average molecular weight of 1,000.

A 2-liter autoclave was charged with 1,000 g of polybutadiene (C), 165 g of maleic anhydride, 300 g of xylene and 2 g of Antigen 3C, and they were reacted at 190° C. for 8 hours in a stream of nitrogen. Then, xylene, and unreacted maleic anhydride were distilled off under reduced pressure to form maleinized polybutadiene (C') having an acid value of 80 and a viscosity of 1200 poises (at 25° C.).

A 2-liter separable flask equipped with a reflux condenser was charged with 100 g of maleinized polybutadiene (C'), 16.6 g of diethylaminoethylamine and 20 g of diethylene glycol dimethyl ether, and they were heated at 130° C. for 2 hours to afford polybutadiene (C") having a tertiary amino group and an imido group. It was then neutralized and diluted with an aqueous solution of acetic acid to prepare an aqueous solution having a solids content of 20% by weight.

Then, 500 g of the aqueous solution was mixed with 3 g of tertiary butyl hydroperoxide, 2 g of cobalt naphthenate, 120 g of n-butyl methacrylate and 40 g of ethylene glycol dimethacrylate, and reacted at 90° C. for 2 hours. The resulting emulsion had an involatile content of 39.4%.

The emulsion was mixed with 200 g of titania by a homomixer. The resulting paint was coated to a thickness of 25 microns on a mild steel panel treated with Bondelite 3114 (a trademark for a product of Nippon Test Panel Co., Ltd.) by a 5-mil applicator. The coated film dried in about 30 minutes at room temperature, and had superior gloss. One week later, the properties of the coated film were measured. It was found to have a pencil hardness of H, a Du Pont impact value of more than 50 mm, an Erichsen value of more than 9 mm, a water resistance of more than 3 days, and a corrosion resistance of 24 hours.

EXAMPLE 4

An aqueous solution having a solids content of 20% was prepared in the same way as in Example 1 except that polybutadiene B-1000 (a product of Nippon Soda Co., Ltd.; 1,2-bond content 90%, number average molecular weight 1000) was used as a starting polybutadiene.

To 1,000 g of this aqueous solution were added 1 g of cobalt naphthenate, 1.5 g of potassium persulfate, 100 g of n-butyl methacrylate and 50 g of diethylaminoethyl acrylate, and while stirring the mixture so that it became uniform, they were reacted at 70° C. for 3 hours.

The resulting emulsion had an involatile content of 30.2%.

The emulsion was kneaded with 210 g of titania by a three-roll mill. The resulting mixture was coated on a mild steel panel using a brush to form a coated film having a thickness of 20 microns. The coated film completely cured in about 1 hour at room temperature, and had superior gloss.

What we claim is:

1. A process for producing a film-forming material, which comprises graft-polymerizing in the absence of a surface active agent a monomer having a radical polymerizable ethylenically unsaturated group in the presence of a radical initiator with a butadiene polymer of a low degree of polymerization having a number average molecular weight of 300 to 10,000, a butadiene copolymer of a low degree of polymerization containing not more than 50% by weight of a copolymer component, or a mixture of these, in the form of an aqueous solution, said butadiene polymer or copolymer in aqueous solution or aqueous dispersion containing 0.05 to 0.5 mole, per 100 g of the polymer, of a basic group of the general formula

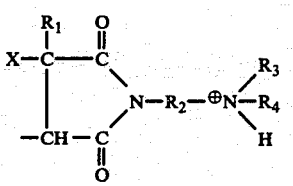

wherein $R_1$ represents a hydrogen atom, a halogen atom or an organic group containing 1 to 8 carbon atoms; $R_2$ and $R_3$ are identical or different and represent an organic group containing 1 to 20 carbon atoms; $R_4$ represents a hydrogen atom or an organic group containing 1 to 20 carbon atoms; and X represents a hydrogen atom or a bond, and when X is a bond, the carbon atom attached to $R_1$ and the adjacent carbon atom to which hydrogen is attached may form a part of the main chain.

2. The process of claim 1 wherein the polymer or copolymer of butadiene further contains not more than 0.2 mole, per 100 g of the polymer, of a group of the following formula

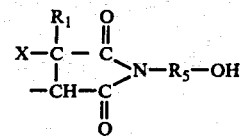

wherein $R_1$ and X are as defined, and $R_5$ represents an organic group containing 1 to 20 carbon atoms.

3. The process of claim 1 wherein the graft-polymerizable reaction is carried out at a temperature of 200° to 100° C.

4. The process of claim 1 wherein the radical polymerizable ethylenically unsaturated monomer is a compound of the formula

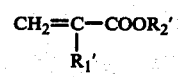

wherein $R_1'$ represents a hydrogen atom or a methyl group, and $R_2'$ represents an organic group containing 1 to 20 carbon atoms, and/or a compound of the general formula

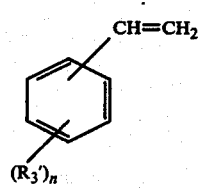

wherein n is an integer of 1 to 4, and $R_3'$ represents a hydrogen atom, an alkyl group containing 1 to 10 carbon atom, a vinyl group, or a halogen atom.

5. The process of claim 1 wherein the amount of the radical polymerizable ethylenically unsaturated monomer is 20 to 500 parts by weight per 100 parts by weight of the butadiene polymer of copolymer.

* * * * *